United States Patent [19]

Sotomura et al.

[11] Patent Number: 5,518,841
[45] Date of Patent: May 21, 1996

[54] COMPOSITE CATHODE

[75] Inventors: Tadashi Sotomura, Kashiwara; Hiroshi Uemachi, Osaka; Yoshiko Miyamoto, Hirakata; Kenichi Takeyama, Osaka, all of Japan

[73] Assignee: Matsushita Electric Industrial Co., Ltd., Kadoma, Japan

[21] Appl. No.: 190,931

[22] Filed: Feb. 3, 1994

[30] Foreign Application Priority Data

Feb. 12, 1993 [JP] Japan ................................ 5-024219
Dec. 3, 1993 [JP] Japan ................................ 5-303994

[51] Int. Cl.$^6$ ................................................ H01M 4/60
[52] U.S. Cl. .................................. 429/213; 252/182.1
[58] Field of Search ........................ 429/213; 252/182.1

[56] References Cited

U.S. PATENT DOCUMENTS

| | | |
|---|---|---|
| 4,664,991 | 5/1987 | Perichaud et al. . |
| 4,687,598 | 8/1987 | Varma . |
| 4,833,048 | 5/1989 | Dejonghe et al. . |
| 5,108,855 | 4/1992 | Daifuku et al. . |
| 5,324,599 | 6/1994 | Oyama et al. ................ 429/213 X |

FOREIGN PATENT DOCUMENTS

| | | |
|---|---|---|
| 62-2469 | 1/1987 | Japan . |
| 3-46756 | 2/1991 | Japan . |
| 5-67477 | 3/1993 | Japan . |

OTHER PUBLICATIONS

M. Liu et al, "Electrochemical Properties of Organic Disulfide/Thiolate Redox Couples", J. Electrochemical Society, vol. 136, No. 9, pp. 2570–2575 (Sep. 1989).

*Primary Examiner*—John S. Maples
*Attorney, Agent, or Firm*—Cushman, Darby & Cushman

[57] ABSTRACT

A composite cathode for a battery is disclosed. In addition, a method is disclosed for producing said composite cathode which can be configured in a battery. The method comprises steps or (1) preparing a solution or an organic disulfide compound in 2-pyrrolidone or its derivative, (2) adding polyaniline to the solution to dissolve, thereby obtaining a homogeneous liquid, and then (3) removing at least a part of the 2-pyrrolidone or its derivative from the homogeneous liquid to obtain a solid product wherein the organic disulfide compound and the polyaniline are homogeneously mixed.

13 Claims, No Drawings

COMPOSITE CATHODE

BACKGROUND OF THE INVENTION

1. Field of the Invention

The present invention relates to a composite electrode which has a wide application in various electrochemical devices such as batteries, electrochromic display devices, sensors and memories. More particularly, the present invention provides a composite electrode which comprises a plurality of organic compounds, or a plurality of organic and inorganic compounds. It is further concerned with a method for producing such an electrode as well as a lithium secondary battery using such an electrode as its cathode.

2. Description of the Related Art

Since conductive polyacetylene was discovered by Shirakawa et al. in 1971, the use of this conductive polymer as an electrode material has been extensively studied. This is because electrochemical devices such as lightweight batteries with a high energy density, electrochromic display devices having a large area and rapid coloring and decoloring characteristics, and biochemical sensors using minute electrodes can be expected to be realized by using the conductive polymer as the electrode material. The polyacetylene however has some disadvantages for practical use in the electrodes because of its chemical instability, and hence, research has since been directed to other $\pi$ electron conjugated conductive polymers, which are relatively stable, such as polyaniline, polypyrrole, polyacene and polythiophene. Lithim secondary batteries using these polymers for their cathodes have already been developed.

Separate from this, disulfide compounds have been proposed as organic materials which may realize a high energy density in electrochemical devices, for example, disclosed in Dejoughe et al., (U.S. Pat. No. 4,833,048). Typical disulfide compounds are represented, in their most basic form, by the formula: R—S—S—R (wherein, R represents an aliphatic or an aromatic organic residue, and S represents a sulfur atom). The S—S bond may be cleaved by electrolytic reduction to form a salt with a cation ($M^+$) in an electrolytic cell. The salt is represented by the formula of R—$S^-$·$M^+$. The salt of R—$S^-$·$M^+$ may be returned to the original R—S—S—R by electrolytic oxidation. A metal-sulfur type rechargeable battery constructed by combining a disulfide type compound with a metal (M) which supplies and captures cations ($M^+$) is proposed in Dejoughe et al. As described therein, it is expected that such a secondary battery will have an energy density of 150 Wh/kg or more, which is much more than that of the conventional secondary batteries.

These conductive polymer electrodes, comprising at least one of polyaniline, polypyrrole, polyacene and polythiophene, take in anions existing in the electrolyte as well as cations upon an electrode reaction while they are charged or discharged, and hence the electrolyte in the battery not only functions as a transfer medium for ion conduction but also participates in the battery reaction. Therefore, it is required that the electrolyte is supplied to the battery in an amount corresponding to the battery capacity. Thus, it has some disadvantages that the energy density of the battery is limited that much to the range of about 20 to 50 Wh/kg, which is nearly half of that of the conventional secondary batteries such as nickel-cadmium or lead-acid batteries.

On the other hand, as Dejoughe et al. reported in J. Electrochem. Soc., Vol. 136, No. 9, pp. 2570 to 2575 (1989), the difference between oxidation potential and reduction potential of the organic disulfide compound is as large as 1 volt or more in an electrolysis of, for instance, a compound $[(C_2H_5)_2NCSS^-]_2$. According to the electrode reaction theory, the electron transfer of the disulfide compound proceeds extremely slowly. Because of this, it is rather difficult to obtain a rechargeable battery which may provide a higher current output of, for instance, 1 mA/cm² or more at room temperature. Therefore, there is a disadvantage that the operation of a battery comprising an electrode of disulfide compound is limited to that at a high temperature in the range of from 100° C. to 200° C., where the electron transfer can proceed faster.

SUMMARY OF THE INVENTION

The present invention provides a novel composite electrode, which overcomes the above-discussed and numerous other disadvantages and deficiencies of the prior art, and is excellent in reversibility being capable of charging and discharging at a large current at room temperature, while maintaining tile above-mentioned preferable features of high energy density held by the organic disulfide compounds. It also provides a method of producing such electrodes.

The method of producing a composite electrode in accordance with the present invention comprises the steps of:

(1) dissolving an organic disulfide compound which contains at least one sulfur-sulfur bond or at least two thiolate or thiol groups in 2-pyrrolidone or its derivative represented by the formula:

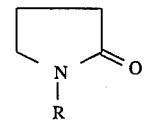

where R represents a hydrogen atom or an alkyl group, to form a solution, the sulfur-sulfur bond being cleaved when electrolytically reduced to form thiolate groups or thiol groups and the sulfur-sulfur bond being regenerated when the thiolate or thiol groups are electrolytically oxidized, (2) adding polyaniline to the solution to dissolve the polyaniline, thereby obtaining a homogeneous liquid, and (3) removing at least a part of the 2-pyrrolidone or its derivative from the homogeneous liquid to obtain a solid product wherein the organic disulfide compound and the polyaniline are homogeneously mixed.

The thiolate group is represented by —SMe where Me is a metal atom, and the thiol group is represented by —SH.

In the method mentioned above, the step (3) may optionally be preceded by a step of applying the homogeneous liquid obtained in the previous step on a substrate to form a layer.

The above-mentioned method may further comprise the steps of:

(1) pulverizing the solid product to obtain a powder wherein the organic disulfide compound and the polyaniline are homogeneously mixed, and (2) molding the powder with the application of pressure to obtain a composite electrode of film shape or plate shape.

The above-mentioned method may further comprise the steps of:

(1) pouring the 2-pyrrolidone or its derivative solution on a polyaniline film to be flown or spread thereover, and (2) heating the polyaniline film, having a layer of the solution thereon, in a vacuum or in an inert gas atmosphere.

In the above-mentioned method, the polyaniline film is preferably obtained by applying an 2-pyrrolidone or its derivative solution of polyaniline on a substrate and removing the 2-pyrrolidone or its derivative contained in the applied solution.

Further, the above-mentioned method may also comprise the steps of:

(1) adding a metal oxide powder to the homogeneous liquid obtained in the previous step to obtain a mixture wherein the metal oxide powder is homogeneously dispersed in the liquid, and (2) removing at least a part of the 2-pyrrolidone or its derivative from the mixture to obtain a solid product wherein the organic disulfide compound, the polyaniline and the metal oxide powder are homogeneously mixed.

The above-mentioned method may further comprise the steps of:

(1) applying the mixture wherein the metal oxide powder is homogeneously dispersed in the homogeneous liquid obtained in the previous step on a substrate to form a layer, and (2) removing at least a part of the 2-pyrrolidone or its derivative from the applied layer to obtain a solid product film wherein the organic disulfide compound, the polyaniline and the metal oxide are homogeneously mixed.

The above-mentioned method may further comprise the steps of:

(1) pulverizing the solid product film to obtain a powder wherein the organic disulfide compound, the polyaniline and the metal oxide are homogeneously mixed, and (2) molding the powder with the application of pressure to obtain a composite electrode of film shape or plate shape.

In the above-mentioned method, the polyaniline is preferably a polyaniline of de-doped and reduced state, and the metal oxide is preferably at least one of transition metal oxide selected from the group consisting of $LiCoO_2$, $V_6O_{13}$, $LiMn_2O_4$, $V_2O_5$ and $LiNiO_2$.

In the above-mentioned method, the organic disulfide compound is at least one selected from the group consisting of dithioglycol ($HSCH_2CH_2SH$), 2,5-dimercapto- 1,3,4-thiadiazole ($C_2N_2S(SH)_2$), 2,4,6-trithiol ($C_3H_3N_3S_3$), 7-methyl-2,6,8-trimercaptopurine ($C_6H_6N_4S_3$), and 4,5-diamino-2,6-dimercaptopyrimidine ($C_4H_6N_4S_2$).

The composite electrode according to the present invention comprises:

an organic disulfide compound, and polyaniline.

In the above-mentioned composite electrode, the polyaniline may be homogeneously mixed with the organic disulfide compound, or may alternatively be in a film, on which a layer containing the disulfide compound is laminated.

The above-mentioned composite electrode may optionally comprise 2-pyrrolidone or its derivative.

The electrode works regardless of the presence or absence of the 2-pyrrolidone or its derivative.

The above-mentioned composite electrode may further comprise a metal oxide powder which is homogeneously mixed with the polyaniline and organic disulfide compound.

While the novel features of the present invention are set forth in the preceding, the invention, both as to organization and content, can be further understood and appreciated, along with other objects and features thereof, from the following detailed description and examples.

DETAILED DESCRIPTION OF THE INVENTION

The present invention provides a composite electrode, which combines an organic disulfide compound with polyaniline, or the organic disulfide compound and polyaniline with a metal oxide powder, by utilizing a phenomenon that the disulfide compound and polyaniline can give a homogeneous mixture if they are dispersed with a medium comprising 2-pyrrolidone or its derivative.

An organic disulfide compound (hereinafter referred to "S—S compound"), 2-pyrrolidone or its derivative and polyaniline each has a certain solubility with one another at room temperature and, when combined, form a homogeneous composite product having a certain adhesive property. In the composite product, the S—S compound functions as an electrode reaction substance, and gives an ion conductivity to the composite product. The polyaniline functions as an electrode reaction substance as well as a catalyst for an electrode reaction of the S—S compound, and gives an electronic conductivity to the composite product. Thus, when the above-mentioned composite product is employed for the electrode material, a difference between oxidation potential and reduction potential generated by the S—S compound decreases to 0.1 volt or smaller from the conventional value of 1 volt or larger. Therefore, the electrode reaction is promoted and a preferable ion conductive and electron conductive network is formed in the composite electrode, and hence, a charge and discharge at a large current can be made possible even at room temperature.

Although an introduction of an electrode catalyst into an electrode of an organic disulfide compound is discussed in the above-mentioned U.S. Pat. No. 4,833,048 or in J. Electrochem. Soc., Vol. 136, p.2570–2575 (1989), only an organic metal compound is disclosed as the electrode catalyst. There is no concrete description on the advantage of the introduction of the electrode catalyst.

Although the solubility of polyaniline in 2-pyrrolidone or its derivative is as small as several percent by weight, the solubility increases up to an equimolar amount for the 2-pyrrolidone or its derivative if the S—S compound is present together with the polyaniline. The S—S compound and 2-pyrrolidone or its derivative are readily soluble with each other and give a homogeneous solution having some viscosity even in a mixture of an equimolar amount. It is believed that an association may take place among an —SH group in the S—S compound, a =C=O group in the 2-pyrrolidone or its derivative and an —NH group in the polyaniline in its phenylene diamine structure one another through a hydrogen bond or the like, and results in a homogeneous composite product. The —NH group is produced in the polyaniline when it constitutes the phenylene diamine structure in its reduced and de-doped state.

In the production method of the composite electrode in accordance with the present invention, an electrode, wherein the content of polyaniline in one side face thereof is higher than that in the other side face, can be produced. Such an electrode is produced by coating a 2-pyrrolidone or its derivative, solution of the S—S compound on a polyaniline film, which has previously been prepared, and then by heating the whole in a vacuum or in an inert atmosphere. When the thus prepared composite electrode is employed in an electrochemical device such as a battery, a device having a large output current can be produced. For such an electrochemical device, by arranging the electrode such that the face of a higher content of the polyaniline having a high electronic conductivity is in contact with a current collector, and that the face of a higher content of the S—S compound having a high ionic conductivity is in contact with an electrolyte. By arranging the composite electrode in the above-mentioned manner, a preferable contact between the electrode and the electrolyte and that between the electrolyte and the current collector can be ensured in both the electronic and ionic points of view.

In particular, it is possible to obtain a lithium secondary battery having a high energy density and a large output current, by employing metal lithium, a lithium alloy such as lithium-aluminum or lithium-manganese, or a carbon material, a metal sulfide, a metal oxide or an electrically-conductive polymer which can reversibly intercalating or deintercalating lithium as its anode, and by employing the composite electrode produced in accordance with the present invention as its cathode.

In a composite electrode produced in accordance with the present invention by employing the organic S—S compound, polyaniline and metal oxide in combination, a sulfur-metal ion bond of the S—S compound dissociates to form a S—S compound anion, and this anion dopes into a site of nitrogen atom in the polyaniline in lieu of the electrolyte anion during a charging (oxidation) process of the composite electrode, and hence, the polyaniline is doped without consuming the electrolyte anion. Further, the S—S compound polymerizes through a sulfur-sulfur bond and forms a side or secondary chain against the main or primary chain in the polyaniline. With the progress of doping of the polyaniline, an electronic conductive path in the composite electrode develops or grows to form a network, and promotes a charging reaction (oxidation) of the metal oxide. The oxidation of the metal oxide proceeds with the de-doping of the metal cation and the de-doped metal cation deposits on the anode in its metal state or is doped in the anode, and thus no electrolyte is consumed.

On the contrary, during a discharging (reduction) process of the composite electrode, a doping is made on the metal-cation which has previously been formed by dissolution of the anode or by de-doping of the anode, maintaining the network of the electronic conductive path, which has previously been formed with the polyaniline and the S—S compound by the dissolution of the anode or by the de-doping of the anode. Next, a de-polymerization of the polymerized S—S compound occurs, and the S—S compound anion de-polymerized to its monomer state finally de-dopes from the polyaniline. That is, no electrolyte is consumed also in the discharging process and the electronic conductive path developed in the network state promotes the discharging of the metal oxide.

Therefore, the composite electrode produced in accordance with the present invention can obtain a higher service capacity by 1.5 times or 2 times as compared with an electrode solely composed of polyaniline or an electrode comprised of polyaniline and metal oxide in combination. Further, since the electronic conductive path in the network state is formed with the polyaniline and the S—S compound, the oxidizing and reducing reactions of the metal oxide are promoted and result in a small polarization value, and a larger current can be flown therethrough as compared with the electrode comprised of polyaniline and metal oxide in combination.

In producing a composite electrode in accordance with the present invention, wherein 2-pyrrolidone or its derivative is employed as the medium, and polyaniline in a de-doped and reduced state is employed as the polyaniline, it is possible to obtain a composite electrode wherein metal oxide is homogeneously dispersed only by a mechanical dispersing and mixing means. That is, in 2-pyrrolidone or its derivative, the polyaniline in a de-doped and reduced state and the S—S compound form a composite product excellent in their solubility and thus give a homogeneous solution. This solution can be diluted with 2-pyrrolidone or its derivative in an arbitrary proportion.

Therefore, a composite electrode of a uniform composition can be obtained by homogeneously dispersing metal oxide powder in 2-pyrrolidone or its derivative by only means of mechanical dispersion and mixing, then by molding the dispersion in a suitable shape if required and thereafter by removing at least a part of the 2-pyrrolidone or its derivative contained in the dispersion.

In the prior art production of the composite electrode comprised of polyaniline and metal oxide in combination, it has been conventional to obtain a composite product of the polyaniline and the metal oxide by polymerizing through an electrolytic or chemical oxidation an aniline monomer in a state of a solution with dispersed metal oxide powder. In the case of polyaniline is present solely, only about 0.1. g of polyaniline can however be dissolved in 1 g of 2-pyrrolidone or its derivative. In contrast to this, 0.5 g or more of polyaniline can be dissolved in 1 g of the 2-pyrrolidone or its derivative in the presence of the S—S compound together with the polyaniline.

The S—S compound monomer used in the present invention can be exemplified by at least one of the compounds represented by the general formula $(R(S)_y)_x$, which are disclosed in the United State Patent No. 4,833,048. In the general formula, R represents an aliphatic residue or an aromatic residue, S represents sulfur, y represents an integer of one or larger and n represents an integer of two or larger. The compound can specifically be exemplified by dithioglycol represented by $HSCH_2CH_2SH$ (hereinafter referred to "DTG"), 2,5-dimercapto-1,3,4-thiadiazole represented by $C_2N_2S(SH)_2$ (hereinafter referred to "DMcT"), s-triazine-2,4,6-trithiol represented by $C_3H_3N_3S_3$ (hereinafter referred to "TTA"), 7-methyl-2,6,8-trimercaptopurine represented by $C_6H_6N_4S_3$ (hereinafter referred to "MTMP"), 4,5-diamino-2,6-dimercaptopyrimidine represented by $C_4H_6N_4S_2$ (hereinafter referred to "DDPy") or the like. Any of commercially available products of these compounds can be employed as it is.

A commercially available reagent of the certified grade may be employed as the 2-pyrrolidone or its derivative. These can be exemplified as 2-pyrrolidone wherein R is hydrogen atom, N-methyl-2-pyrrolidone wherein R is methyl group, N-ethyl-2-pyrrolidone wherein R is ethyl group, N-n-butyl-2-pyrrolidone wherein R is n-buthyl group, and the like, having an alkyl group of straight chain or branched chain. Particularly preferred 2-pyrrolidone or its derivative is one having a low molecular weight of 2-pyrrolidone, N-methyl-2-pyrrolidone or N-ethyl-2-pyrrolidone.

As the polyaniline, any of polymerized products obtained by oxidizing aniline in an electrolytic oxidation process or a chemical oxidation process can be employed. From a point of view of its solubility, it is preferable to use a de-doped and reduced state polyaniline. As such polyaniline, ANILEAD (Registered trade name, polyaniline, conductivity=$10^{-9}$ S/cm, density=1.3 g/cc), is available from Nitto Denko Corp., Japan.

The composite formation of the S—S compound, 2-pyrrolidone or its derivative and polyaniline can be performed by first mixing the S—S compound with 2-pyrrolidone or its derivative to obtain a viscous liquid and then adding polyaniline powder to the liquid thus obtained to dissolve therein. Inn particular, a composite electrode film whose one side face is abundant in polyaniline and the other side face is abundant in the S—S compound can be obtained in the following manner. That is, a polyaniline film is first prepared in a film state on a substrate, and a 2-pyrrolidone or its derivative solution containing the S—S compound is coated over the film thus obtained, and then the whole is heated in a vacuum or an inert gas atmosphere at a temperature ranging from 60° C. to 100° C. The polyaniline in a film state can be obtained by depositing polyaniline on the substrate by an electrolytic polymerization. Such polyaniline film can alternatively be obtained by synthesizing polyaniline by an electrolytic polymerization or a chemical polymerization, and then pouring a solution prepared by dissolving the polyaniline in 2-pyrrolidone or its derivative, on a substrate to be flown or spread thereover; thereafter, the 2-pyrrolidone or its derivative contained in the poured solution is removed. Preferable mixing ratio of the S—S compound, 2-pyrrolidone or its derivative and polyaniline is somewhere in 1 mole of the S—S compound to 0.5–5 moles of 2-pyrrolidone or its derivative and to 0.05–5 moles of polyaniline.

Any of the oxides of transition metals or their complex or double oxides can be used as the metal oxide though, those compounds having an electrochemical equivalent which is equal to that of polyaniline of 150 mAh/g or larger are preferable. The preferred transition metal oxide can be exemplified by $LiCoO_2$ (electrochemical equivalent= 140–160 mAh/g), $V_6O_{13}$ (electrochemical equivalent= 160–230 mAh/g), $LiMn_2O_4$ (electrochemical equivalent= 100–120 mAh/g), $V_2O_5$ (electrochemical equivalent= 130–150 mAh/g) and $LiNiO_2$ (electrochemical equivalent= 140–220 mAh/g). These transition metal oxide may be employed in a powdery state with a mean particle size ranging from 1 μm to 10 μm. A plurality of the transition metals may be contained in the transition metal oxide. For instance, a double oxide of $LiCoO_2$ type whose Co is partly substituted by Mn, Ni or Fe, or a double oxide of $V_6O_{13}$ type whose V is partly substituted by W can also be used.

The composite formation of polyaniline, the S—S compound and metal oxide is performed in the following manner. First, the S—S compound is dissolved in 2-pyrrolidone or its derivative to obtain a viscous liquid and polyaniline powder is added to the liquid to be dissolved therein. If required for the dissolving, the added liquid is heated. And, if required, 2-pyrrolidone or its derivative is further added thereto to dilute the mixture. Then, a slurry which has previously been prepared by dispersing the powder of metal oxide in 2-pyrrolidone or its derivative is added to the diluted solution and the whole is uniformly dispersed in a homogenizer. The dispersion thus obtained is flown or spread over a substrate such as glass flat dish or carbon film, and the whole is heated under a reduced pressure to remove at least a part of the 2-pyrrolidone or its derivative contained in the dispersion to obtain a composite electrode. A preferred mixing ratio of polyaniline and the S—S compound is somewhere in 1 mole of the polyaniline to 0.5–5 moles of the S—S compound. A preferred mixing ratio of polyaniline and the metal oxide is somewhere in 1 part by weight of the polyaniline to 0.5– 5 parts by weight of the metal oxide.

In addition to an alkali metal ion and alkaline earth metal ion disclosed in the above mentioned U.S. patent, a proton can also be employed as a metal ion which is required when the S—S compound is reduced to form a salt.

In the case of employing lithium ion as the alkali metal ion in particular, a lithium secondary battery having a high energy density which exceeds 100 Wh/kg at a cell voltage of about 3 V can be configured with an electrode which can supply or capture lithium ion and an electrolyte which can transfer the lithium ion, in the following manner. That is, as the electrode which can supply or capture the lithium ion, there is employed a metal lithium or a lithium alloy such as lithium-aluminum. As the electrode which can reversibly intercalate or deintercalate the lithium ion, there is employed a carbon material such as graphite, a metal sulfide, a metal oxide, or an organic semiconductor material such as polyacene.

In an alternative case of employing proton, a secondary battery having a cell voltage ranging from 1 V to 2 V can be configured by employing a hydrogen storage alloy such as $LaNi_5$ or its hydride as an electrode which can supply or capture the protons, and a proton-conductive electrolyte.

In addition to the above-defined components, the composite electrode of the present invention can include an electric conductivity enhancing agent such as carbon, a shape-retaining agent or reinforcing agent such as a synthetic rubber, a resin, or a ceramic powder. Further, for the purpose of improving the ion conductivity of the composite electrode, any of a solid electrolyte, a polymer electrolyte, an organic electrolyte can be incorporated.

The present invention may be further understood by reference to the following non-limiting examples and comparative examples.

EXAMPLE 1

One point five (1.5) g (0.01 mole) of 2,5-dimercapto-1,3,4-thiadiazole (hereinafter referred to "DMcT") monomer powder were dissolved in 3 g (0.03 mole) of N-methyl-2-pyrrolidone (hereinafter referred to "NMP") to obtain a yellowish transparent viscous DMcT-NMP solution. To this solution, were added 0.5 g (0.003 mole) of polyaniline powder ("ANILEAD" available from Nitto Denko Corp., Japan) and the combined solution was then heated at 80° C. in a sealed container whose inner atmosphere was replaced by an inert gas to obtain a black purple non-transparent composite product having certain adhesive property. The composite product thus obtained was printed on an electrically-conductive carbon film with a thickness of 20 μm, composed of carbon black and a fluorocarbon resin, in a manner to give a layer with a thickness of 200 μm over the film. The printed film was punched into disks having a diameter of 12.5 mm to give an electrode A.

EXAMPLE 2

By adding 0.5 g (0.003 mole) of polyaniline powder ("ANILEAD" available from Nitto Denko Corp., Japan) to 100 ml of NMP and pouring a supernatant (20 ml) of the mixture over a glass flat dish with a diameter of 90 mm, and then heating the poured supernatant in a vacuum at 60° C. to remove the NMP contained therein, a polyaniline film (0.15 g, 0.001 mole) with a thickness of 20 μm was obtained. A DMcT-NMP solution (DMcT 0.0033 mole and NMP 0.01 mole) obtained by dissolving 1.5 g of DMcT monomer powder in 3 g (0.03 mole) of NMP was then spread over the polyaniline film. The whole was heated at 80° C. in an argon atmosphere to obtain a composite product film with a thickness of 125 μm. This composite product film was rolled with the application of pressure together with a carbon film similar to that of Example 1 to obtain a unitary body and punched into disks having a diameter of 12.5 mm to give an electrode B.

COMPARATIVE EXAMPLE 1

Separately, an electrode C having a thickness of 130 μm and a diameter of 12.5 mm was produced by using 0.55 parts by weight of DMcT, 0.35 parts by weight of graphite powder and 2.0 parts by weight of a gel electrolyte, which will be mentioned below.

PRODUCTION OF BATTERY CELLS

First, the above-mentioned gel electrolyte was prepared by gelling 3.0 g of polyacrylonitrile with a mixed solution (1:1 by volume) of propylene carbonate and ethylene carbonate which dissolved $LiBF_4$ in 1M. By using each of the electrode A and B obtained by Examples 1 and 2, and the electrode C obtained by Comparative Example 1 as the cathode, a metal lithium disk with a thickness of 0.3 mm as the anode, and the above mentioned gel electrolyte as the separator layer which was formed to have a thickness of 0.6 mm, battery cells A, B or C each having a diameter of 13 mm were produced, respectively.

EVALUATION OF ELECTRODE PERFORMANCE

After charging the battery cells A, B and C at a constant charging voltage of 3.5 V at room temperature for 17 hours, each of the battery cells was discharged at a constant discharge current of 1 μA, 10 μA, 100 μA, 500 μA or 1 mA for 30 seconds, and the cell voltages at the end of the discharging were recorded. The electrode performances were evaluated with respect to their current-voltage characteristics of the battery cells. The results of the evaluation were summarized in Table 1 below.

TABLE 1

| | (Voltages of the battery cells, V) | | |
| --- | --- | --- | --- |
| | Electrode | | |
| Current Value | A Example 1 | B Example 2 | C Comparative Example 1 |
| 1 μA | 3.28 | 3.20 | 2.32 |
| 10 μA | 3.26 | 3.18 | 1.85 |
| 100 μA | 3.22 | 3.02 | 1.15 |
| 500 μA | 3.08 | 2.88 | 0.64 |
| 1 mA | 2.82 | 2.66 | 0.18 |

As clearly shown by the above results, it was appreciated that the battery cells using the electrodes A and B of Examples 1 and 2 produced in accordance with the present invention gave higher cell voltages as compared with the battery cell using the electrode C of Comparative Example 1. Taking the cell voltages at the discharging current value of 500 μA for comparison, it was found that the electrodes A and B gave a higher cell voltage by around 2.0 V than that of the electrode C. That is, by using an electrode produced in accordance with the present invention, it is possible to obtain a battery cell which can be serviceable at a high discharge current.

EXAMPLE 3

One point five (1.5) g (0.01 mole) of DMcT monomer powder were dissolved in 5 g of NMP to obtain a yellowish transparent viscous DMcT-NMP solution. To this solution, 2.5 g (0.015 mole) of polyaniline powder in a de-doped and reduced state ("ANILEAD" available from Nitto Denko Corp., Japan) were added and the combined solution was then heated at 80° C. in a sealed container, whose inner atmosphere was replaced by an inert gas, to obtain a black purple liquid.

Separately, a slurry was obtained by dispersing 2.5 g of $V_6O_{13}$ powder having a mean particle size of 6 μm in 10 g of NMP, and thoroughly mixing the dispersion. The slurry thus obtained was then added to the above-mentioned black purple liquid and mixed in a homogenizer at 5000 rpm. for about 10 minutes to obtain a dispersion. The dispersion was then heated in a rotary evaporator to remove a part of the NMP and to make it a dispersion having some adhesive property, and printed on an electrically-conductive carbon film with a thickness of 20 μm, composed of carbon black and a fluorocarbon resin, in a manner to give a layer having a thickness of 120 μm over the film. After heating the obtained film for about 30 minutes at 80° C. in a vacuum of 20 cm Hg to remove the NMP contained therein, it was punched into disks having a diameter of 12.5 mm to give a composite electrode D.

EXAMPLE 4

One point five (1.5) g (0.01 mole) of DMcT monomer powder were dissolved in 5 g of NMP to obtain a yellowish transparent viscous DMcT-NMP solution. To this solution, 2.5 g (0.015 mole) of polyaniline powder in a de-doped reduced state ("ANILEAD" available from Nitto Denko Corp., Japan) were added and the combined solution was then heated at 80° C. in a sealed container, whose inner atmosphere was substituted by an inert gas, to obtain a black purple liquid.

Separately, a slurry was obtained by dispersing and mixing 2.5 g of $LiCoO_2$ powder having a mean particle size of 12 μm in 10 g of NMP. The slurry thus obtained was then added to the above-mentioned black purple liquid and mixed in a homogenizer at 5000 rpm. for about 10 minutes to obtain a dispersion. The dispersion was then heated in a rotary evaporator to remove a part of the NMP and to make it a dispersion having some adhesive property, and printed on an electrically-conductive carbon film with a thickness of 20 μm, composed of carbon black and a fluorocarbon resin, in a manner to give a layer with a thickness of 120 μm over the film. After heating the obtained film for about 30 minutes at 80° C. in a vacuum of 20 cm Hg to remove a part of the NMP contained therein, it was punched into disks having a diameter of 12.5 mm to give a composite electrode E.

EXAMPLE 5

One point five (1.5) g (0.0087 mole) of DDPy monomer powder were dissolved in 5 g of NMP to obtain a yellowish transparent DDPy-NMP solution with some viscosity. To this solution, 2.5 g (0.015 mole) of polyaniline powder in a de-doped reduced state ("ANILEAD" available from Nitto Denko Corp., Japan) were added and the combined solution was then heated at 80° C. in a sealed container, whose inner atmosphere: was substituted by an inert gas, to obtain a black purple liquid.

Separately, a slurry was obtained by dispersing and mixing 2.5 g of LiNiO$_2$ powder having a mean particle size of 8 μm in 10 g of NMP. The slurry thus obtained was then added to the above-mentioned black purple liquid and mixed in a homogenizer at 5000 rpm. for about 10 minutes to obtain a dispersion. The dispersion was then heated in a rotary evaporator to remove a part of the NMP and to make it a dispersion having some adhesivity, and printed on an electrically-conductive carbon film with a thickness of 20 μm, composed of carbon black and a fluorocarbon resin, in a manner to give a layer with a thickness of 120 μm over the film. After heating the obtained film for about 30 minutes at 80° C. in a vacuum of 20 cm Hg to remove the NMP contained therein, it was punched into disks having a diameter of 12.5 mm to give a composite electrode F.

EXAMPLE 6

One point five (1.5) g (0.0087 mole) of DDPy monomer powder were dissolved in 5 g of NMP to obtain a yellowish transparent viscous DDPy-NMP solution. To this solution, 2.5 g (0.015 mole) of polyaniline powder in a de-doped reduced state ("ANILEAD" available from Nitto Denko Corp., Japan) were added and the combined solution was then heated at 80° C. in a sealed container, whose inner atmosphere was substituted by an inert gas, to obtain a black purple liquid.

Separately, a slurry was obtained by dispersing and mixing 2.5 g of LiMn$_2$O$_4$ powder having a mean particle size of 5 μm in 10 g of NMP. The slurry thus obtained was then added to the above-mentioned black purple liquid and mixed in a homogenizer at 5000 rpm. for about 10 minutes to obtain a dispersion. The dispersion was then heated in a rotary evaporator to remove a part of the NMP and to make it a dispersion having some adhesivity, and printed on an electrically-conductive carbon film with a thickness of 20 μm, composed of carbon black and a fluorocarbon resin, in a manner to give a layer with a thickness of 120 μm over the film. After heating the obtained film for about 30 minutes at 80° C. in a vacuum of 20 cm Hg to remove the NMP contained therein, it was punched into disks having a diameter of 12.5 mm to give a composite electrode G.

EXAMPLE 7

One point five (1.5) g (0.01 mole) of DMcT monomer powder were dissolved in 5 g of NMP to obtain a yellowish transparent viscous DMcT-NMP solution. To this solution, 2.5 g (0.015 mole) of polyaniline powder in a de-doped reduced state ("ANILEAD" available from Nitto Denko Corp., Japan) were added and the combined solution was then heated. at 80° C. in a sealed container, whose inner atmosphere was substituted by an inert gas, to obtain a black purple liquid.

Separately, a slurry was obtained by dispersing and mixing 2.5 g of V$_2$O$_5$ powder having a mean particle size of 15 μm in 10 g of NMP. The slurry thus obtained was then added to the above-mentioned black purple liquid and mixed in a homogenizer at 5000 rpm. for about 10 minutes to obtain a dispersion. The dispersion was then heated in a rotary evaporator to remove a part of the NMP and to make it a dispersion having some adhesivity, and the thus treated dispersion was poured on a glass flat dish to be flown thereover. The poured dispersion was then heated for about 5 hours at 80° C. under a reduced pressure of a vacuum of 1 cm Hg to obtain a black film. The film thus obtained was pulverized to give an electrode powder.

Separately, a gel electrolyte was prepared by gelling 3.0 g of polyacrylonitrile with a mixed solution (1:1 by volume) of propylene carbonate and ethylene carbonate which dissolved LiBF$_4$ in 1M.

A composite electrode H is produced by mixing 5 parts by weight of the above electrode powder with 4 parts by weight of the gel electrolyte, and then by printing the mixture on the carbon film in a manner to give a layer with a thickness of about 120 μm thereover and by punching the printed film into disks having a diameter of 12.5 mm.

EXAMPLE 8

One point five (1.5) g (0.0087 mole) of DDPy monomer powder were dissolved in 5 g of NMP to obtain a yellowish transparent viscous DDPy-NMP solution. To this solution, 2.5 g (0.015 mole) of polyaniline powder in a de-doped reduced state ("ANILEAD" available from Nitto Denko Corp., Japan) were added and the combined solution was then heated at 80° C. in a sealed container, whose inner atmosphere was substituted by an inert gas, to obtain a black purple liquid.

Separately, a slurry was obtained by dispersing and mixing 2.5 g of V$_6$O$_{13}$ powder having a mean particle size of 6 μm in 10 g of NMP. The slurry thus obtained was then added to the above-mentioned black purple liquid and mixed in a homogenizer at 5000 rpm. for about 10 minutes to obtain a dispersion. The dispersion was then heated in a rotary evaporator to remove a part of the NMP and to make it a dispersion having some adhesivity, and the thus treated dispersion was poured on a glass flat dish to be flown thereover. The poured dispersion was then heated for about 5 hours at 80° C. under a reduced pressure of a vacuum of 1 cm Hg to obtain a black film. The film thus obtained was pulverized to give an electrode powder which was then finished to a composite electrode I in a manner similar to that in Example 7.

PRODUCTION OF BATTERY CELLS

By using the composite electrodes D, E, F, G, H and I obtained by Examples 3, 4, 5, 6, 7 and 8, as the cathodes, metal lithium disks with a thickness of 0.3 mm as the anodes, and the above mentioned gel electrolyte as the separator layer with a thickness of 0.6 mm, battery cells D, E, F, G, H and I each having a diameter of 13 mm were produced, respectively.

COMPARATIVE EXAMPLE 2

Separately, an electrode J having a thickness of 120 μm and a diameter of 12.5 mm was produced by mixing 5 parts by weight of mixed powder composed of 2.5 g of polyaniline powder which was the same as that used in Examples 3–8, and 2.5 g of V$_2$O$_5$ powder having a mean particle size of 15 μm, with 4 parts by weight of the above-mentioned gel electrolyte. The mixture was printed on a carbon film in a manner to give a layer of about 120 μm thickness and then punched into disks. Using the electrode J, a battery cell J was produced in a similar manner to those of the battery cells D–I above.

COMPARATIVE EXAMPLE 3

An electrode K having a thickness of 120 μm and a diameter of 12.5 mm was produced by mixing 5 parts by weight of mixed powder composed of 2.5 g of the same polyaniline powder and 2.5 g of V$_6$O$_{13}$ powder having a mean particle size of 6 μm, with 4 parts by weight of the above-mentioned gel electrolyte. The mixture was printed on a carbon film in a manner to give a layer of about 120 μm thickness and then punched into disks. Using the electrode K, a battery cell K was produced in a similar manner to those of the battery cells. D–I above.

COMPARATIVE EXAMPLE 4

Separately, an electrode L having a thickness of 120 μm and a diameter of 12.5 mm was produced by pouring a solution composed of 5 g of NMP and 0.2 g of polyaniline dissolved in the former over a glass flat dish and repeating an operation of removing the NMP by drying the solution for 8 times at 80° C. under a reduced pressure of a vacuum of 1 cm Hg to obtain an electrode comprising polyaniline film having a thickness of 120 μm. Using the electrode L, a battery cell L was produced in a similar manner to those of the battery cells D–I above.

EVALUATION OF ELECTRODE PERFORMANCE

After charging the battery cells D, E, F, G, H, I, J, K and L at a constant charging voltage of 4.3 V at room temperature for 17 hours, each of the battery cells was discharged at a constant discharge current of 1 μA, 10 μA, 100 μA, 500 μA or 1 mA for 30 seconds, and the cell voltages at the end of the discharging were recorded. The electrode performances were evaluated with respect to the current-voltage characteristics of the battery cells. The results of the evaluation were summarized in Table 2 below.

TABLE 2

| Cell Current value | (Voltages of the battery cells, V) | | | | |
|---|---|---|---|---|---|
| | 1 μA | 10 μA | 100 μA | 500 μA | 1 mA |
| Examples | | | | | |
| D | 3.95 | 3.55 | 3.22 | 3.05 | 2.85 |
| E | 4.10 | 3.96 | 3.72 | 3.58 | 3.41 |
| F | 4.15 | 4.02 | 3.86 | 3.65 | 3.43 |
| G | 4.25 | 4.12 | 3.96 | 3.82 | 3.58 |
| H | 3.85 | 3.45 | 3.02 | 2.80 | 2.61 |
| I | 4.00 | 3.65 | 3.32 | 3.02 | 2.82 |
| Comparative examples | | | | | |
| J | 3.52 | 3.25 | 2.85 | 2.25 | 1.98 |
| K | 3.61 | 3.26 | 3.05 | 2.47 | 2.12 |
| L | 3.55 | 3.46 | 3.15 | 3.05 | 2.55 |

Further, after charging the battery cells D, E, F, G, H, I, J, K and L at a constant charging voltage of 4.3 V at room temperature for 17 hours, each of the battery cells was continuously discharged at a constant discharge current of 270 μA, and each of the service capacities of the battery cells, after each of the cell voltages became down to 1.5 V, was measured. The results of the service capacity measurements were summarized in Table 3 below.

TABLE 3

| | Service Capacity (mAh) | | | | | | | | |
|---|---|---|---|---|---|---|---|---|---|
| | Battery Cell | | | | | | | | |
| | D | E | F | G | H | I | J | K | L |
| Service capacity | 3.5 | 2.5 | 2.8 | 2.1 | 3.0 | 3.6 | 2.5 | 2.8 | 1.7 |

As clearly shown by the above mentioned results, it was appreciated that the battery cells D, E, F, G, H and I produced in accordance with the present invention each gave a higher cell voltage as compared with the battery cells J, K and L of the comparative examples. It was further appreciated that the battery cells of the present invention were able to operate at a larger discharge current and had larger capacities than those of the comparative examples.

As has been discussed in the foregoing, the composite electrode, which combines the organic disulfide compound, polyaniline and N-methyl-2-pyrrolidone, and is produced in accordance with the present invention, makes the battery operation at a larger current possible, which has been difficult for the conventional electrode comprising the organic disulfide compound solely.

The other composite electrode, which combines the organic disulfide compound, polyaniline and metal oxide, and is produced in accordance with the present invention, gives a battery capacity 1.5–2 times as large as compared with the electrode composed solely of polyaniline. It also makes the operation with a small voltage drop, i.e., in a low polarization, possible. The operation with a small voltage drop has been difficult for the conventional electrode comprising polyaniline and metal oxide.

In the foregoing embodiments, although the results of the evaluations of the electrode performances by using the battery cells which uses metal lithium as the anode, it is also possible to configure an electrochromic display device having a rapid coloring and decoloring speeds, and a biochemical sensor such as a glucose sensor having a rapid response as well as an electrochemical analog memory which has rapid write-in and read-out speeds by employing the electrode in accordance with the present invention as the counter electrode.

Although the present invention has been described in terms of the presently preferred embodiments, it is to be understood that such disclosures are not to be interpreted as limiting. Various alterations and modifications will no doubt become apparent to those skilled in the art to which the present invention pertains, after having read the above disclosure.

What is claimed is:

1. A composite electrode comprising:
    an organic disulfide compound which contains at least one sulfur-sulfur bond or at least two thiolate or thiol groups, wherein said sulfur-sulfur bond is cleaved when electrolytically reduced to form thiolate groups or thiol groups and said sulfur-sulfur bond is regenerated when said thiolate or thiol groups are electrolytically oxidized, N-alkyl-2-pyrrolidone or 2-pyrrolidone represented by the formula:

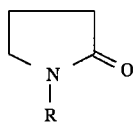

where R represents a hydrogen atom or an alkyl group, and polyaniline.

2. The composite electrode according to claim 1, wherein said organic disulfide compound is at least one selected from the group consisting of dithioglycol ($HSCH_2CH_2SH$), 2,5-dimercapto-1,3,4-thiadiazole ($C_2N_2S(SH)_2$), s-triazine-2,4,6-trithiol ($C_3H_3N_3S_3$), 7-methyl-2,6,8-trimercaptopurine ($C_6H_6N_4S_3$), and 4,5-diamino-2,6-dimercaptopyrimidine ($C_4H_6N_4S_2$).

3. A composite electrode comprising:

an organic disulfide compound which contains at least one sulfur-sulfur bond or at least two thiolate or thiol groups, wherein said sulfur-sulfur bond is cleaved when electrolytically reduced to form thiolate groups or thiol groups and said sulfur-sulfur bond is regenerated when said thiolate or thiol groups are electrolytically oxidized, N-alkyl-2-pyrrolidone or 2-pyrrolidone represented by the formula:

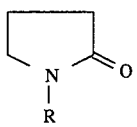

where R represents a hydrogen atom or an alkyl group, polyaniline, and a metal oxide powder.

4. The composite electrode according to claim 1 or 3, wherein said polyaniline is a polyaniline of de-doped and reduced state.

5. The composite electrode according to claim 4, wherein said metal oxide is at least one of transition metal oxide selected from the group consisting of $LiCoO_2$, $V_6O^{13}$, $LiMn_2O_4$, $V_2O_5$ and $LiNiO_2$.

6. A composite electrode comprising:

an organic disulfide compound which contains at least one sulfur-sulfur bond or at least two thiolate or thiol groups, wherein said sulfur-sulfur bond is cleaved when electrolytically reduced to form thiolate groups or thiol groups and said sulfur-sulfur bond is regenerated when said thiolate or thiol groups are electrolytically oxidized, polyaniline, and a metal oxide powder which is homogeneously mixed with said organic disulfide compound and said polyaniline.

7. The composite electrode according to claim 6, wherein said polyaniline is a polyaniline of de-doped and reduced state.

8. The composite electrode according to claim 6, wherein said metal oxide is at least one of transition metal oxide selected from the group consisting of $LiCoO_2$, $V_6O_{13}$, $LiMn_2O_4$, $V_2O_5$ and $LiNiO_2$.

9. A lithium secondary battery comprising:

an electrolyte;

an anode; and a composite cathode comprising:

an organic disulfide compound which contains at least one sulfur-sulfur bond or at least two thiolate or thiol groups, wherein said sulfur-sulfur bond is cleaved when electrolytically reduced to form thiolate groups or thiol groups and said sulfur-sulfur bond is regenerated when said thiolate or thiol groups are electrolytically oxidized;

polyaniline, wherein said organic disulfide compound and said polyaniline are homogeneously mixed; and N-alkyl-2-pyrrolidone or 2-polyrrolidone represented by the formula:

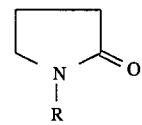

where R represents a hydrogen atom or an alkyl atom.

10. The lithium secondary battery comprising a cathode, an electrolyte and an anode, wherein the cathode is a composite electrode, which comprises:

an organic disulfide compound which contains at least one sulfur-sulfur bond or at least two thiolate or thiol groups wherein said sulfur-sulfur bond is cleaved when electrolytically reduced to form thiolate groups or thiol groups and said sulfur-sulfur bond is regenerated when said thiolate or thiol groups are electrolytically oxidized;

polyaniline; and a metal oxide powder which is homogeneously mixed with said organic disulfide compound and said polyaniline.

11. The composite electrode according to claim 10, wherein said metal oxide is at least one of transition metal oxide selected from the group consisting of $LiCoO_2$, $V_6O_{13}$, $LiMn_2O_4$, $V_2O_5$ and $LiNiO_2$.

12. A composite electrode comprising:

an organic disulfide compound which contains at least one sulfur-sulfur bond or at least two thiolate or thiol groups, wherein said sulfur-sulfur bond is cleaved when electrolytically reduced to form thiolate groups or thiol groups and said sulfur-sulfur bond is regenerated when said thiolate or thiol groups are electrolytically oxidized, and polyaniline which is homogeneously mixed with said organic disulfide compound, said polyaniline and said organic disulfide being homogeneously mixed by the process comprising the steps of:

dissolving said organic disulfide compound and said polyaniline in a solvent; and removing said solvent to obtain said homogenous mixture.

13. A lithium secondary battery comprising a cathode, an electrolyte, and an anode, wherein said cathode is a composite electrode comprising:

an organic disulfide compound which contains at least one sulfur-sulfur bond or at least two thiolate or thiol groups, wherein said sulfur-sulfur bond is cleaved when electrolytically reduced to form thiolate groups or thiol groups and said sulfur-sulfur bond is regenerated when said thiolate or thiol groups are electrolytically oxidized, and polyaniline which is homogeneously mixed with said organic disulfide compound, said polyaniline and said organic disulfide being homogeneously mixed by the process comprising the steps of:

dissolving said organic disulfide compound and said polyaniline in a solvent; and removing said solvent to obtain said homogenous mixture.

* * * * *